S. H. HALL.
BACK PRESSURE REGULATOR FOR CENTRIFUGALIZING MACHINES.
APPLICATION FILED APR. 30, 1914.
1,189,687.
Patented July 4, 1916.
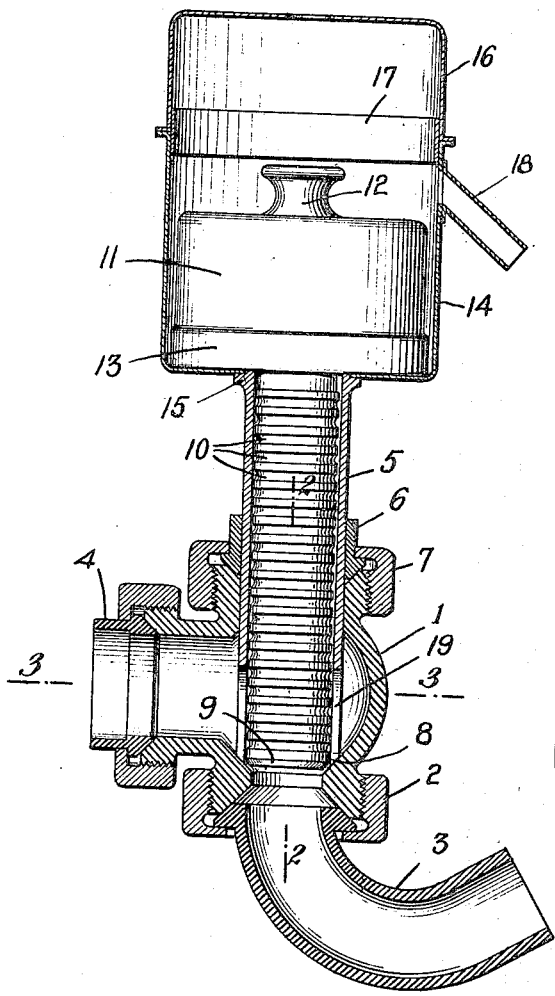
Fig. 1,
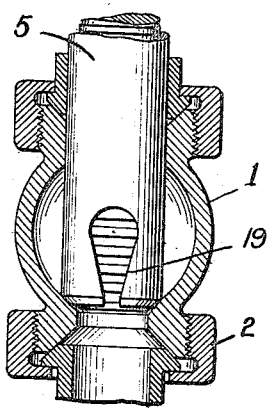
Fig. 2,
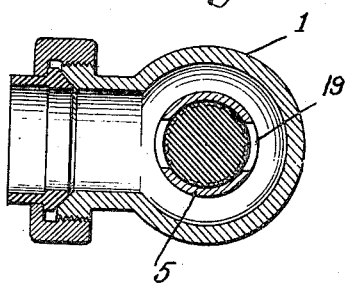
Fig. 3.
WITNESSES
INVENTOR
Selden H. Hall.
BY
ATTORNEYS

UNITED STATES PATENT OFFICE.

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

BACK-PRESSURE REGULATOR FOR CENTRIFUGALIZING-MACHINES.

1,189,687.   Specification of Letters Patent.   Patented July 4, 1916.

Application filed April 30, 1914. Serial No. 835,452.

*To all whom it may concern:*

Be it known that I, SELDEN H. HALL, a citizen of the United States, residing at Poughkeepsie, county of Dutchess, State of New York, have invented certain new and useful Improvements in Back-Pressure Regulators for Centrifugalizing-Machines; and I do hereby declare the following to be a full, clear, and exact description of the invention, such as will enable others skilled in the art to which it appertains to make and use the same.

The present invention has for its object the provision of automatic means for maintaining a uniform pressure in a passage through which liquid is passing, and irrespective of the rate of flow of the liquid. It is particularly applicable for effective service in maintaining a uniform pressure in passages wherein the rate of flow is subject to considerable variation. A specific instance of its availability for practical uses is, for example, its utilization for maintaining a uniform back pressure in the discharge passages of centrifugalizing machines and the like, wherein, in order to avoid forming, said passages are sealed against the ingress of air, all as particularly described and claimed in my application for Letters Patent of the United States, Serial No. 756,835, filed March 26, 1913.

It is a further object to reduce to a minimum the friction of the moving parts and to make the valve sensitive and quickly responsive, and in order that the action may be steady and in order that the valve may not suddenly open or close, a damping means is provided which, though offering practically no resistance to slow movements of the valve, offers a high resistance to quick movements, and thus prevents dancing of the valve.

It is a further object to provide a construction in which at low rates of discharge the movement of the valve for a given change in area of opening shall be great, and at high rates the movement shall be small.

To accomplish the foregoing objects, I make use of a weighted plunger, the lower end of which serves as a valve, and I use the weight element of this plunger as the moving member of a dash-pot normally supplied with fluid leaking up around the plunger and between it and a guide-tube in which it loosely fits. The lower end of the guide-tube is provided with ports of progressively increasing width, so that as the valve lifts, the area of discharge opening increases at a progressively increasing rate.

Other objects and advantages of the present invention will be made clear by the following detailed description, which is to be taken in conjunction with the accompanying drawing, in which, Figure 1 is an elevation partly in section of a regulating valve embodying my invention; Fig. 2 shows the lower end of the guide-tube with its ports of progressively increasing width; and Fig. 3 is a horizontal cross-section on the line 3—3 of Fig. 1.

In the embodiment illustrated in the drawing, there is provided a valve casing 1, attached to the lower end of which by means of a coupling-nut 2, is a tube 3 for receiving the fluid discharge from a centrifugalizing machine of suitable character, as, for instance, that disclosed and claimed in my application Ser. No. 756,835, filed March 26, 1913. Casing 1 is also coupled to a discharge tube 4 into which the fluid is liberated after passing the valve.

Detachably mounted in fitting 1 is a guide-tube 5 having an attached collar 6 provided with a flange engaged by a coupling-nut 7 to hold the tube in position with its lower beveled edge 8 fitting within casing 1 just above the inlet.

Slidingly mounted in guide-tube 5 is a plunger, the lower end 9 of which acts as a valve. This plunger has a plurality of annular grooves 10, forming integral piston-rings therebetween, which are spaced uniformly throughout the length of the plunger which fits loosely within the guide-tube. Secured to the top of this plunger is a cylindrical weight 11 having a hand-grip 12, and having at its lower edge an enlargement 13 so that the weight may act as the piston of a dash-pot. Inclosing weight 11 is a cylindrical casing 14 secured to a flange 15 near the top of guide-tube 5. The enlargement 13 of weight 11 fits loose enough in casing 14 to permit slow passage of fluid through the annular space which separates them. The casing forms a leakage chamber into which fluid passing upward between the plunger and its guide-tube may be received and held as a damping medium to prevent sudden movements of the piston. Surmounting the casing 14 and removable therefrom is a cylindrical cover 16 having a ring 17 covering the joint. An overflow tube 18 is provided whereby an excess of fluid in the leakage chamber may be returned to the inlet of the centrifugalizing machine.

At the lower end of guide-tube 5, a plurality of ports 19 are provided, these preferably being of increasing width from the bottom upward, as indicated in Fig. 2, so that as the plunger moves upward, the rate of change in the fluid flow will progressively increase.

The operation of the pressure regulator is as follows: Liquid, the pressure on which is to be regulated, comes from the centrifugalizing machine, or other source not shown, through the tube 3, and is stopped by the valve 9 until the pressure in tube 3 builds up sufficiently to lift the valve plunger and its weight. In rising, the valve 9 uncovers and opens the ports 19 and provides an escape for the liquid into the valve casing 1 from which it passes on to the outlet pipe 4 and may be conveyed away. If the flow of liquid from the machine increases, the pressure in pipe 3 will tend to increase, but in response to this increased pressure, valve 9 will rise and provide a larger opening through the ports 19. Similarly, if the flow decreases, the valve will fall and partially close the ports, thus maintaining a pressure in pipe 3 at all times just sufficient to support the valve plunger and its weight.

The valve ports 19 are made narrow at the lower end so that when operating at low discharge the valve will not open or close so suddenly as to cause pulsations in the pressure, and by having the discharge ports 19 wide at the top, the valve when operating at high discharge will be able to accommodate itself readily to changes in rate with a relatively small movement.

By providing the plunger with a plurality of rings serving as piston-rings, and by fitting the plunger loosely in the tube, 5, it will be surrounded with liquid leaking up into chamber 14, and so will encounter very little friction in its up and down movements. The liquid which leaks up and around the plunger into chamber 14 will there surround the weight 11 to serve as a resisting medium preventing sudden movement of the weight. The clearance between piston 13 and its inclosing casing is such that when the valve moves upward liquid will pass from above the weight to the lower side, and, similarly, on the downward movement, the liquid will be forced upward through the annular space. But this space is so narrow that there is a high resistance to quick movements, although practically none to slow movements. From chamber 14 the excess fluid may overflow through pipe 18, as, for instance, into the feed-cup of the machine.

I claim:
1. A fluid pressure regulator, comprising a plunger adapted to serve as a valve, a guide-tube inclosing said plunger with a loose fit to permit leakage, a weight for said plunger and an overflow chamber receiving fluid leaking upward between the plunger and its guide-tube, said weight making a loose fit in said chamber.

2. In a fluid pressure regulator, a valve casing, a guide-tube secured in said casing and having ports, a plunger loosely fitting in said guide-tube and serving to close said ports and a leakage chamber above said guide-tube to receive fluid passing upward between the plunger and its guide-tube.

3. In a fluid pressure regulator, a valve casing, a guide-tube secured in said casing and having ports, a plunger loosely fitting in said guide-tube and serving to close said ports, a leakage chamber above said guide-tube to receive fluid passing upward between the plunger and its guide-tube, and a piston loosely fitting in said chamber and secured to said plunger to damp its sudden movements.

4. In a fluid pressure regulator, the combination of a valve casing, a guide-tube projecting into said casing and having discharge ports, a plunger positioned to open or close said ports and having throughout its length a loose fit in said guide-tube so that fluid may leak upward within the tube, a leakage chamber above said guide-tube for receiving said fluid and a weight connected to said plunger and movable as a piston in said leakage chamber to damp sudden movements of the plunger while freely permitting slow movements thereof.

5. In a fluid pressure regulator, the combination of a valve casing having an inlet, a guide-tube projecting into said casing and having discharge ports above said inlet, a weighted plunger loosely fitting in said guide-tube and shaped at its lower end to form a valve, said plunger being adapted to move upward under fluid pressure to uncover the ports in said guide-tube, said ports being tapered to increase the rate of change in fluid discharge as the valve moves upward.

6. In a fluid pressure regulator, the combination of a valve casing having an inlet and a discharge opening, means for supplying fluid under pressure to said inlet, a guide-tube projecting into said casing and removable therefrom for cleaning, a plunger having annular grooves forming a plurality of rings loosely fitting within said guide-tube to permit leakage of fluid through the tube, thereby reducing the friction when the plunger moves, a chamber surmounting said guide-tube and receiving the fluid leaking therethrough, and a weight for said plunger loosely fitting in said chamber to form a dash-pot by action on the fluid therein when the plunger moves up and down, said guide-tube having ports above said inlet through which the fluid may discharge when the piston rises, said ports increasing in area from bottom to top to permit smaller movements of the plunger at heavy discharge rates than at low discharge rates.

In testimony whereof I affix my signature, in presence of two witnesses.

SELDEN H. HALL.

Witnesses:
   HUBERT M. SPROSS,
   CHARLES L. POWELL.